April 6, 1926.  
A. O. EDWARDS  
WATER GATE  
Original Filed June 9 1922  
1,579,288
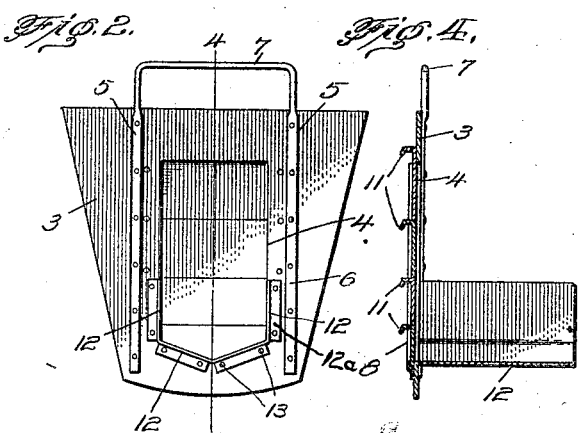
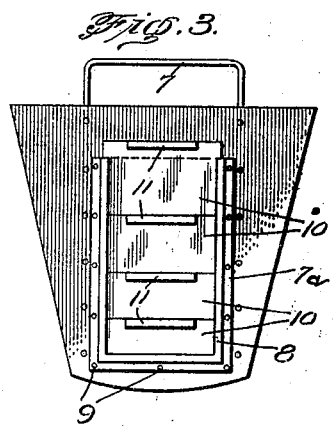
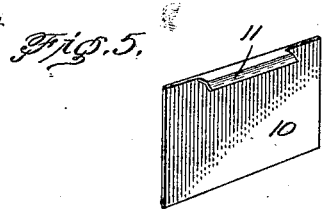
A. O. Edwards, INVENTOR.
BY Geo. F. Kimmel
ATTORNEY.

Patented Apr. 6, 1926.

1,579,288

UNITED STATES PATENT OFFICE.

AUGUST O. EDWARDS, OF WILLIAMS, OREGON.

WATER GATE.

Application filed June 9, 1922, Serial No. 567,008. Renewed January 29, 1926.

*To all whom it may concern:*

Be it known that I, AUGUST OTTO EDWARDS, a citizen of the United States, residing at Williams, Josephine County, and State of Oregon, have invented certain new and useful Improvements in Water Gates, of which the following is a specification.

This invention has reference to improvements in water gates, and its object is to provide for the spilling of the water from a high point which may be varied as the operator desires and such high point is so regulated that débris or other deleterious matter is prevented from collecting, whereby obstructions to the flow of water are avoided and consequently there never occurs such obstruction to the flow of water that would force an excess of water over the land to be irrigated.

Furthermore, there is provided a container or trough at the rear face of the water gate and extending substantially halfway up the water gate opening whereby the overflow of water at the gate is prevented from washing or cutting away the soil at the rear of the gate.

The improved water gate is made of sheet metal of sufficiently heavy gage to answer the purposes of the invention.

In accordance with the invention, there is provided a main canal or stream for the flow of water to outlets where the water is distributed over the fields to be irrigated, and at each of the side canals leading from the main canal may be provided a gate similar to the main overflow gate.

The invention will be best understood from a consideration of the following detailed description taken in connection with the accompanying drawings forming part of this specification, with the understanding that the invention is not confined to any strict conformity with the showing of the drawings, but may be changed and modified so long as such changes and modifications mark no material departure from the salient features of the invention as expressed in the appended claims.

In the drawings:—

Figure 1 is a perspective view of a main canal, numerous branch canals leading to the areas to be irrigated, and a view, more or less in detail, of a water gate controlling the main canal, all the gates being of similar construction, Fig. 2 is an elevation of one face of the gate for controlling the flow of water through the canal, Fig. 3 is an elevation of the other face of the gate.

Fig. 4 is a section on the line 4—4 of Fig. 2.

Fig. 5 is a perspective view of one element of one of the gates.

Referring to the drawings, there is shown in Fig. 1, a main canal or stream 1 of sufficient length and depth for the purposes of the invention.

Leading off from the main stream 1 are numerous branch streams 2.

Adapted to be driven into the wall of the main canal 1, crosswise thereof, so as to extend for the full width and height of the canal, is a plate 3 which may be made of sheet iron of sufficient gage for the purpose, and to withstand the stream of water flowing through the main canal.

Extending through the thickness of the plate 3 is an opening or passage 4 representing the total clearance through the plate for the stream of water passing along the canal 1.

Extending about the opening 4 in spaced relation thereto is a bail 5, riveted or otherwise secured to the plate 3. The bail 5 has side members 6 and a top cross member 7 spaced above the top of the plate 3 and sufficiently sturdy to withstand hammer blows used to force the plate 3 into the ground forming the banks of the canal 1 until the plate has reached the full depth to which it is to be installed.

On the face of the plate 3 remote from the bail 5 is a guide frame 7ª provided with an interior marginal rim 8 slightly overhanging the inner edge of the opening 4, the frame 7ª being secured to the corresponding face of the plate 3 by rivets 9 or otherwise.

The overhang 8 provides a retaining channel or groove for a series of gate sections 10, one of which is shown separately in Fig. 5.

The sections 10 are all alike except that they are graded in height, so that when all the sections 10 are in place, they will more than fill or close the opening 4.

While the sections 10 are all alike except as to height, each is formed on the upper edge with a lip 11 serving as a handle the top of each handle being flush with the top edge of its respective gate section.

Secured to the face of the plate 3, remote from the side of the frame 11 is a trough-shaped extension 12, of the same width and contour as the lower end of the opening 4 and having around the edge of the end abutting the plate, outturned ears 12ª which press against and are rigidly secured to the face of the plate by rivets 13. This trough is designed to receive the impact of the stream of water flowing through the canal 1 and which may, at the time, be overflowing the upper edge of the highest one of the sections 10. This permits the stream flowing through the canal 1 to fall upon a sheet metal trough represented at 12 and to pass to a distant point down the stream 1.

The irrigating streams flowing through the canals 2 are provided with plates 3ª acting as retaining dams for the canals 2 and to support gate sections 10ª constructed and acting in the same manner as the sections 10 in the main canal 1.

What is claimed is:—

1. In a water gate adapted to be positioned transversely of an irrigating canal, a plate having a vertical rectangular opening therethrough, a substantially U-shaped frame secured to the face of said plate and overhanging the edge of said opening, a series of gate sections of graduated size, each removably held in said frame across said opening, a rigid trough secured upon and projected from that face of said plate opposite the side carrying said frame and following the contour of the lower portion of said opening, and means carried upon the plate by which the same may be placed into or removed from position.

2. In a water gate adapted to be positioned transversely of an irrigating canal, a plate having a vertical rectangular opening therethrough, a substantially U-shaped frame secured to the face of said plate and overhanging the edge of said opening, said frame being substantially Z-shaped in cross section, a series of gate sections of graduated size, each removably held in said frame across said opening, an outstanding lip member carried from the upper edge of each section and serving as a handle, each of said lip members extending at right angles from and having its top flush with the top edge of its respective section, a rigid trough secured upon and projecting at right angles from that face of said plate opposite the side carrying said frame and of the same contour as and flush upon the inner side with the lower portion of said opening, and means carried upon the plate by which the same may be placed into or removed from position.

In testimony whereof, I affix my signature hereto.

AUGUST O. EDWARDS.